Oct. 28, 1924.
J. B. IRWIN ET AL
1,513,166
LOCOMOTIVE AND CAR WHEEL FLANGE LUBRICATOR
Filed Nov. 17, 1922   2 Sheets-Sheet 2
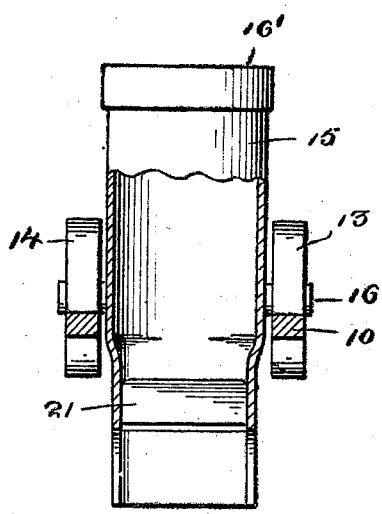
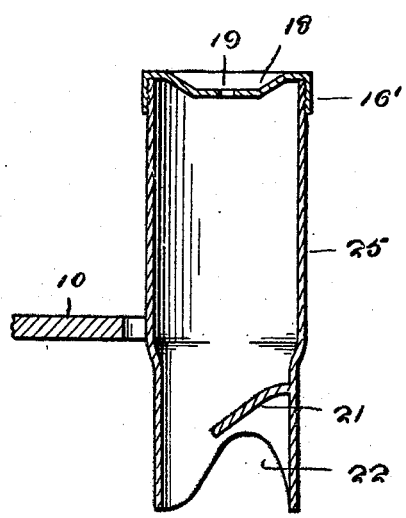
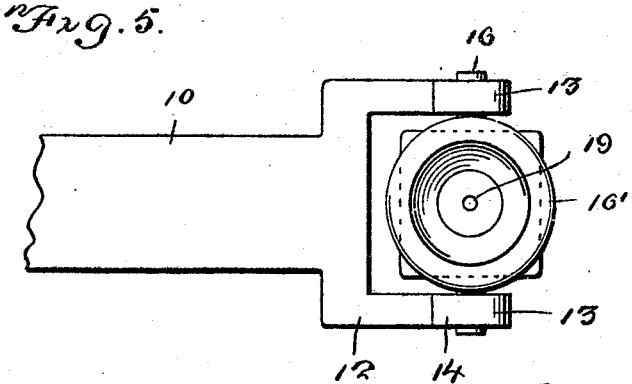

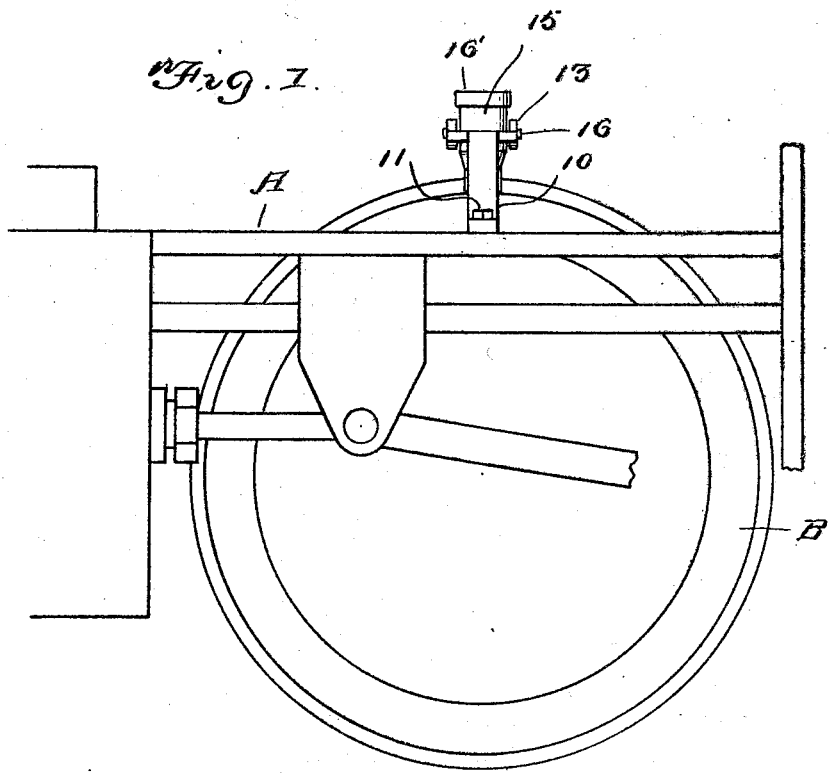
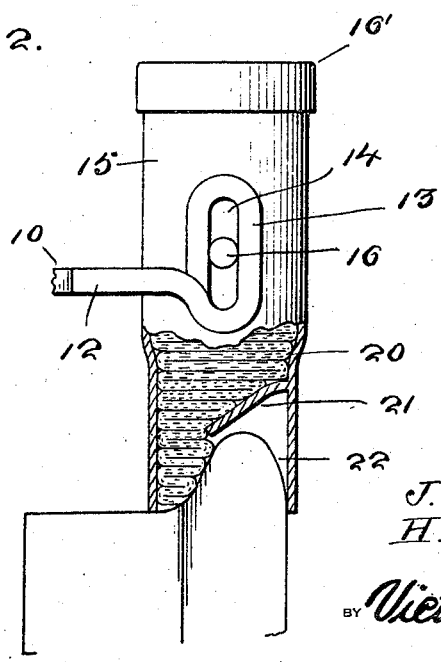

Patented Oct. 28, 1924.

1,513,166

UNITED STATES PATENT OFFICE.

JAMES B. IRWIN AND HARRY E. FELTER, OF ALLIANCE, NEBRASKA.

LOCOMOTIVE AND CAR WHEEL FLANGE LUBRICATOR.

Application filed November 17, 1922. Serial No. 601,529.

*To all whom it may concern:*

Be it known that we, JAMES B. IRWIN and HARRY E. FELTER, citizens of the United States, residing at Alliance, in the county of Box Butte and State of Nebraska, have invented new and useful Improvements in Locomotive and Car Wheel Flange Lubricators, of which the following is a specification.

This invention relates to lubricating devices and has for its object the provision of a novel device adapted to be mounted upon a locomotive, locomotive tender, or car for the purpose of lubricating the flanges of the driving wheels, tender truck, or car wheels, so as to reduce wear on the flanges, and also on the rails, particularly at curves.

An important object is the provision of a novel device of this character which may be manufactured and sold as a separate entity to be attached at a convenient location upon a locomotive, locomotive tender, or car, and including a container filled with lubricant to be fed to the flanges of the driving wheels, engine truck wheels, trailer wheels, or car wheels.

An additional object is the provision of a device of this character which will be simple and inexpensive in manufacture, and installation, highly efficient in use, positive in action, durable in service and a general improvement in the art.

With the above and other objects and advantages in view the invention consists in the details of construction to be hereinafter more fully described and claimed and illustrated in the accompanying drawings, in which:

Figure 1 is a side elevation of a portion of a locomotive showing our device as applied to a driving wheel tire, Figure 2 is a sectional view through a portion of the locomotive showing an elevation of our device at right angles to Figure 1, Figure 3 is a longitudinal section through the device itself, Figure 4 is a sectional view of the device taken at right angles to Figure 3 and Figure 5 is a plan view.

Referring more particularly to the drawings, the letter A designates a portion of the frame of a locomotive, and B designates a drive wheel. In carrying out our invention we provide a bracket 10 which is adapted to be bolted or otherwise secured to the frame A, as shown at 11, by the use of a suitable extension bracket. This arrangement is also to be used in bolting this device to the frame of the engine truck, trailer truck, tender truck or car, the bracket extending in a horizontal position as shown. The free end of the bracket is widened as shown at 12 and is formed as an open frame to define arms 13 which are bent upon themselves as shown or otherwise formed to provide spaced vertically extending slotted guides 14.

The lubricating device itself comprises an upright vertical casing 15 made of metal or other material which is provided at opposite sides with trunnions 16 received within the guides 14. By this means the casing 15 is capable of limited vertical and horizontal movement with respect to the supporting bracket. The top of the casing is provided with a cap 16 which fits tightly and which may be secured in position by threading or by other means which may be found preferable. The central portion of the cap is preferably depressed as shown at 18, and is formed with a hole 19 for the passage of oil for the purpose of filling the casing, or to which may be attached an automatic oil cup or a small pipe through which exhaust steam or water might be admitted. This casing is designed to be packed with burlap wicking 20 or other absorbent material which is saturated with the lubricant. Located within the casing is a flange 21 which forms a stop to limit the tendency of the oil from passing to the inside of the tire so that all lubricants will be disposed of on the throat of the flange of the wheel. The lower end of the casing is formed with an opening 22 of the same shape as the cross sectional contour of the flange of the tire of the driving wheel, engine truck wheel, trailer wheel, tender truck wheel, or car wheel and the flange 21 extends over the major portion of this opening.

When the device is installed upon the locomotive or car the flange of the wheel passes through the opening 22 with the rail engaging face of the flange of the wheel rubbing against the lower end of the mass of wicking within the casing. After the wicking is saturated with lubricant this will result in lubricating the flange so that the friction between the flange and the rail will be reduced. The use of this lubricating device will result in a great saving inasmuch as the tires of the driving wheels, engine truck wheels, trailer wheels, tender truck wheels and car wheels and also the rails will wear much less than is ordinarily the case and the saving will be affected by the locomotive or car being in service a greater per cent of the time, and much money will be saved in metal in tires, cost of labor in removing and turning tires, and in track renewals. The device has another advantage in permitting the running of the locomotive upon tracks having a severe curvature without danger of derailment on account of excessive friction between the driving wheels and the rails.

While we have shown and described the preferred embodiment of our invention it is of course to be understood that we reserve the right to make such changes in the form, construction and arrangement of parts as will not depart from the spirit of the invention or the scope of the subjoined claims.

We claim:

1. A lubricating device for flanged wheels of rolling stock, comprising a supporting bracket adapted to be mounted upon a frame element of the rolling stock, an upright casing vertically slidably and laterally swingably mounted within the bracket and adapted to contain a mass of absorbent material saturated with lubricant the bottom of the casing having an opening conforming in shape to the cross sectional contour of the wheel to be lubricated whereby the flange of the wheel will extend into the casing, and a guard flange extending transversely of the casing slightly above said opening to prevent contact of the mass with the outermost edge of the flange.

2. In a lubricating device for flanged locomotive wheels, a bracket adapted for mounting upon the locomotive frame, the bracket being of forked construction and including spaced arms having vertical slots therein, an upright casing mounted within the bracket and having trunnions slidably and rockably engaged within said slots, said casing containing a mass of absorbent material saturated with lubricant, the bottom of the casing being cut away to conform to the shape of the flange of the wheel to be lubricated, and means within the casing supporting said mass for confining contact thereof to the side edge of the wheel flange.

In testimony whereof we affix our signatures.

HARRY E. FELTER.
JAMES B. IRWIN.